US008579069B2

(12) United States Patent
Robillard et al.

(10) Patent No.: US 8,579,069 B2
(45) Date of Patent: Nov. 12, 2013

(54) FORESTRY MACHINES WITH TRANSVERSE ENGINE AND HYDRAULIC SYSTEM INSTALLATION

(75) Inventors: Jerome M. Robillard, Owatonna, MN (US); Chad K. Jorgensen, Byron, MN (US)

(73) Assignee: Caterpillar Inc., Peoria, IL (US)

( * ) Notice: Subject to any disclaimer, the term of this patent is extended or adjusted under 35 U.S.C. 154(b) by 389 days.

(21) Appl. No.: 12/977,438

(22) Filed: Dec. 23, 2010

(65) Prior Publication Data
US 2012/0160587 A1 Jun. 28, 2012

(51) Int. Cl.
*B60K 5/12* (2006.01)

(52) U.S. Cl.
CPC ........................................ *B60K 5/12* (2013.01)
USPC ............................ 180/291; 280/830; 144/4.1

(58) Field of Classification Search
CPC ........................................................ B60K 5/12
USPC ................. 180/291, 297, 299, 305–307, 900; 144/4.1; 280/830
See application file for complete search history.

(56) References Cited

U.S. PATENT DOCUMENTS

| | | | | |
|---|---|---|---|---|
| 3,805,908 | A | * | 4/1974 | Thompson ..................... 180/235 |
| 3,833,034 | A | | 9/1974 | Menzel et al. |
| 4,502,558 | A | * | 3/1985 | Mauri .......................... 180/14.3 |
| 4,679,803 | A | | 7/1987 | Biller et al. |
| 5,687,809 | A | * | 11/1997 | Braud ........................... 180/297 |
| 5,931,247 | A | | 8/1999 | Peterson et al. |
| 5,988,937 | A | * | 11/1999 | Komoriya et al. ............... 404/90 |
| 6,071,066 | A | * | 6/2000 | Braud ........................... 414/686 |
| 6,152,253 | A | * | 11/2000 | Monaghan .................... 180/291 |
| 6,267,163 | B1 | * | 7/2001 | Holmes ......................... 144/336 |
| 6,397,965 | B1 | * | 6/2002 | McFarlane et al. ............ 180/298 |
| D462,701 | S | | 9/2002 | Crabb et al. |
| 6,460,643 | B1 | * | 10/2002 | Degelman .................... 180/89.12 |
| 6,514,031 | B1 | * | 2/2003 | Cook ............................. 414/685 |
| 6,609,581 | B2 | | 8/2003 | Vaile |
| 6,902,026 | B2 | * | 6/2005 | Kinoshita et al. ............. 180/291 |
| 6,997,221 | B2 | | 2/2006 | Kurelek et al. |
| 7,677,279 | B2 | | 3/2010 | Swinyard et al. |
| 7,753,382 | B2 | | 7/2010 | Choi |
| 7,900,996 | B2 | * | 3/2011 | Kimura et al. ............ 296/190.09 |
| 8,051,916 | B2 | * | 11/2011 | Bright et al. ....................... 172/3 |
| 8,061,466 | B2 | * | 11/2011 | Carlton et al. ................. 180/242 |
| 2005/0210717 | A1 | * | 9/2005 | Ueda et al. ........................ 37/443 |
| 2006/0243515 | A1 | * | 11/2006 | Okada et al. .................. 180/305 |
| 2008/0264094 | A1 | | 10/2008 | Campagna et al. |
| 2010/0018728 | A1 | * | 1/2010 | Bright et al. ....................... 172/3 |
| 2010/0102594 | A1 | * | 4/2010 | Kimura et al. ............ 296/190.01 |

* cited by examiner

*Primary Examiner* — John R Olszewski
*Assistant Examiner* — Jacob Meyer
(74) *Attorney, Agent, or Firm* — Miller, Matthias & Hull

(57) ABSTRACT

A wheeled forestry tractors design, such as that for a wheel feller-buncher or a site prep tractor, is disclosed. The disclosed design includes a front axle connected to a rear axle by an articulated chassis. A cab is supported between and above the front and rear axles by the chassis. An engine and a hydraulic system are mounted opposite the rear axle from the cab and in a side-by-side relationship with the engine being aligned transversely with respect to the chassis and parallel to the rear axle. The engine is mounted transversely or parallel with respect to the rear axle and slightly behind the rear axle to improve the weight distribution between the front and rear axles or between the front and rear frames. By mounting the engine transversely and on one side of the rear of the tractor and the hydraulic system on the other side of the tractor in combination with placing the fuel tank in alignment with the engine and the oil tank in alignment with the hydraulic system, improved left to right weight distribution is also achieved.

18 Claims, 5 Drawing Sheets

FORESTRY MACHINES WITH TRANSVERSE ENGINE AND HYDRAULIC SYSTEM INSTALLATION

TECHNICAL FIELD

This disclosure relates generally to forestry machines and, more specifically, to wheeled forestry machines such as wheel feller bunchers and site prep tractors. Still more specifically, this disclosure relates to a transverse engine and hydraulic system installation that provides improved weight distribution and serviceability for wheel feller bunchers and site prep tractors.

BACKGROUND

Feller-bunchers are typically used to fell or cut down trees from one site and then bunch the trees together to place them in a pile. Site prep tractors, on the other hand, are typically used to clear brush, tree stumps and other materials from a site. Both feller-bunchers and site prep tractors may be articulated machines that include a front frame and a rear frame that are pivotally coupled together by a hitch. The hitch allows the front frame to pivot relative to the rear frame for steering the feller-buncher or site prep tractor. Both the front and rear frames include an axle having a pair of wheels mounted thereon.

An engine mounted on the rear frame supplies mechanical power directly to a drop box via a hydrostatic transmission. The drop box splits the power output from the engine between the front axle and the rear axle. A portion of the power from the drop box is supplied directly to the rear axle via a drive line and the rest of the power is supplied to the front axle via a drive shaft and universal joint that passes from the rear frame to the front frame at the hitch.

The engine may also power a hydraulic system that supplies pressurized hydraulic fluid to several non-drive tool systems. Generally, wheel feller-bunchers may include a hydraulically powered rotating saw which is used to cut down the trees during a felling operation. In addition, a feller-buncher may have a number of hydraulically powered work arms which are used to secure the felled trees to the feller-buncher after the trees have been cut down. A site prep tractor may be provided with a number of hydraulically powered attachments such as a rotary axis mower, a side cut felling saw and/or a stump grinder. A number of hydraulically powered cylinders may be used to raise, lower, and tilt the tool systems.

One problem associated with current wheel feller-buncher and site prep tractor designs is the location and orientation of the engine and hydraulic system. Specifically, the engine is typically installed behind the cab and is directed longitudinally towards the cab and tool system. This design provides poor weight distribution across the rear axle and causes many operators to add weight to the rear of the machine to act as a counterbalance. Further, the excess weight of the counterbalance at the rear of the machine causes fuel and oil reserves to migrate towards the rear the machine, thereby possibly creating additional weight imbalance.

Another problem associated with current wheel feller-buncher and site prep tractor designs involves the location of the hydraulic system in the same compartment as the engine. The congested nature of the design does not permit adequate airflow for maximum cooling. Further, both the congested nature of the design makes it difficult to access the engine and the hydraulic system for servicing and maintenance.

Therefore, there is a need for improved wheel feller-buncher and site prep tractor designs that provide improved weight distribution, serviceability and cooling. For the sake of simplicity, wheel feller-bunchers and site prep tractors will be collectively referred herein to as "wheeled forestry tractors."

SUMMARY OF THE DISCLOSURE

In one aspect, a wheeled forestry tractors with at least one attached tool system for clearing land is disclosed. The tractor includes a front axle connected to a rear axle by an articulated chassis. A cab is supported between and above the front and rear axles by the chassis. The tractor also includes an engine and a hydraulic system. The engine and hydraulic system are mounted opposite the rear axle from the cab and in a side-by-side relationship with the engine being aligned transversely with respect to the chassis and parallel to the rear axle.

In another aspect, a wheeled forestry tractors with at least one attached tool system for clearing land is disclosed which also includes a front axle connected to a rear axle by an articulated chassis. A cab is supported between and above the front and rear axle by the chassis. The tractor also includes an engine, a hydraulic system and a fuel tank. The engine and hydraulic system are mounted opposite the rear axle from the cab and in a side-by-side relationship with the engine being aligned transversely with respect to the chassis and parallel to the rear axle. The fuel tank is mounted at least partially above the rear axle and aligned between the engine and the cab.

A method for distributing weight across a rear axle of a wheeled forestry tractors is also disclosed. The method includes providing a wheeled forestry tractors with at least one attached tool system for clearing land. The tractor includes a front axle connected to the rear axle by an articulated chassis. A cab is supported between and above the front and rear axles by the chassis. The tractor further includes an engine and a hydraulic system. The method further includes mounting the engine and hydraulic system to the chassis and opposite the rear axle from the cab and in a side-by-side relationship and with the engine being aligned transversely with respect to the chassis and parallel to the rear axle.

In any one or more of the disclosed tractors or methods, the oil supply and fuel tank and hydraulic system may be disposed on one side of the tractor and the engine disposed on an opposite side of the tractor. Other distributions of the engine and hydraulics across the rear of the tractor are possible. In any one or more of the disclosed tractors or methods, the fuel tank may be disposed at least partially above the rear axle. In any one or more of this disclosed tractors or methods, the fuel tank includes an inlet that is accessible to an operator standing on the ground. In any one or more of the disclosed tractors or methods, at least part of the fuel tank is disposed above the rear axle and at least part of the fuel tank is disposed below the rear axle.

In any one or more of the disclosed tractors or methods, more than about 65% of the weight of the tractor is distributed across the rear axle. In a further refinement of this concept, from about 65% to about 70% of the weight of the tractor is distributed across the axle. In still a further refinement of this concept, about 68% of the weight of the tractor is distributed across the rear axle. By distributing more weight across the rear axle, more weight or material can be lifted or supported by the front axle and front frame before the tractor becomes "tippy".

DETAILED DESCRIPTION

Figure 1:
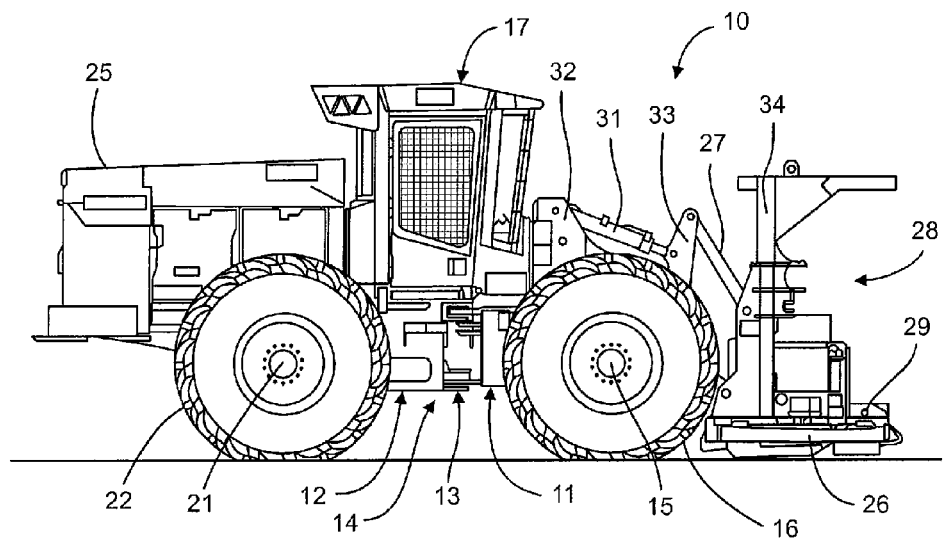
FIG. 1 is a side plan view of a disclosed wheel feller-buncher.

Referring to FIG. 1, a wheel feller-buncher 10 is shown. The wheel feller-buncher 10 includes a front frame 11 and a rear frame 12. The front frame 11 is pivotally connected to the rear frame 12 via a hitch 13. In particular, the hitch 13 allows the front frame 11 to pivot relative to the rear frame 12 so that the front frame 11, rear frame 12 and hitch 13 provide an articulated chassis 14.

The front frame 11 is supported by a front axle 15. Two wheels 16 are mounted on the front axle 15. The front frame 11 also supports a cab 17. The cab 17 includes a seat 18 (see FIG. 3) and a number of controls 19 which are manipulated by the operator (not shown) to control various operations of the feller-buncher 10.

The rear frame 12 is also supported by a rear axle 21. Two wheels 22 are mounted to the rear axle 21. The rear frame 12 also supports an engine 23 and a hydraulic system 24 (see FIG. 3). The engine 23 generates mechanical energy which is transferred to the hydraulic system 24. The hydraulic system 24 includes a number of pumps which convert the mechanical energy of the engine 23 to hydraulic energy which is used to power various hydraulic components of the feller-buncher 10. As will be discussed in greater detail below in connection with FIGS. 3-6, the engine 23 is mounted transversely within the enclosure 25 or, in other words, the engine 23 is mounted on the rear frame 12 in a parallel relationship to the rear axle 21. Instead of extending across the enclosure 25, the engine 23 is mounted on one side of the enclosure 25 while the hydraulic system 24 is mounted on the other side of the enclosure 25.

The feller-buncher 10 includes a saw 26, which is pivotally attached to the front frame 11. The saw 26 rotates or pivots relative to the front frame 11. A pair of lift cylinders 27 are disposed between the front frame 11 and the saw 26. As the lift cylinders 27 are extended, the lift cylinders 27 cause the saw 26 to move downward. On the other hand, as the lift cylinders 27 are retracted, the lift cylinders 27 cause the saw 26 to pivot upward about the front frame 11.

The saw 26 supports a work tool 28. The work tool 28 includes a pair of pins 29 that allow the work tool 28 to pivot upward about the saw 26. The feller-buncher 10 also includes a tilt cylinder 31 disposed between a support 32 that is coupled to the front frame 11 and a support 33 that is coupled to the lift cylinders 27. As the tilt cylinder 31 is extended, the work tool 28 pivots downward about the pins 29. As the tilt cylinder 31 is retracted, the work tool 28 pivots upward about the pins 29. Still referring to FIG. 1, the work tool 28 also includes a support member 34 which supports various components of the work tool 28.

Figure 2:
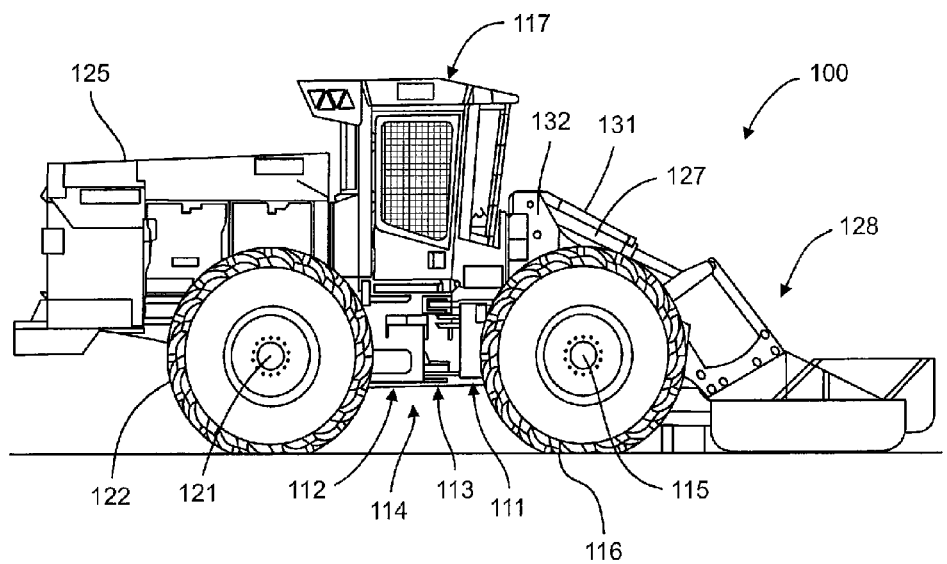
FIG. 2 is a side plan view of a disclosed site prep tractor.

Turning to FIG. 2, a site prep tractor 100 is disclosed. Similar to the feller-buncher 10 of FIG. 1 and FIGS. 3-6, the site prep tractor 100 may include a front frame 111 coupled to a rear frame 112 by a hitch 113 to provide an articulated chassis 114. The front frame 111 may be supported by a front axle 115, which is supported by two wheels 116. The front frame 111 may also support a support member 132 which is coupled to a tilt cylinder 131 and a lift cylinder 132. The lift cylinder 127 may be coupled to a work tool 128, which is a mulcher in FIG. 2. The rear frame 112 may be supported by a rear axle 121 which, in turn, is supported by two rear wheels 122. The rear frame 112 may also support a cab 117 and an enclosure 125 which provides housing for an engine and hydraulic system (not shown).

Returning to FIG. 3, the enclosure 25 may be divided into an engine compartment 36 and a hydraulic system compartment 37. The engine compartment 36 may be sized so that the engine 23 can be mounted transversely or parallel to the rear axle 21 and so that the rear axle 21 is disposed between the engine 23 and the cab 17. Similarly, the hydraulic system 24 may be mounted within the compartment 37 and behind the rear axle 21. An additional rear plan view and perspective views are provided in FIGS. 4-6.

By placing the engine 23 in a transverse orientation or parallel to the rear axle 21 as illustrated in FIGS. 3-6, an undesirable weight imbalance is avoided between the front and rear frames 11, 12 or between the front and rear axles 15, 21. For example, competitive machines that include a longitudinal orientation of the engine closer to the cab require thousands of pounds of steel counterweight towards the rear of the rear frame 12. Further, avoiding the use of thousands of pounds of counterweight towards the rear of the rear frame 12 also prevents fuel and oil reserves from migrating towards the rear of the machine, thereby creating weight imbalances from left to right or vice versa. Further, a longitudinal orientation of the engine 23 does not provide for effective flow-through cooling of the engine.

As a solution to these problems, a transversal orientation of the engine 23 provides for a better weight distribution between the front and rear frames 11, 12 or between the front and rear axles 15, 21. In one disclosed design, about 68% of the weight is disposed over the rear axle 21. This percentage may vary, however.

Figure 4:
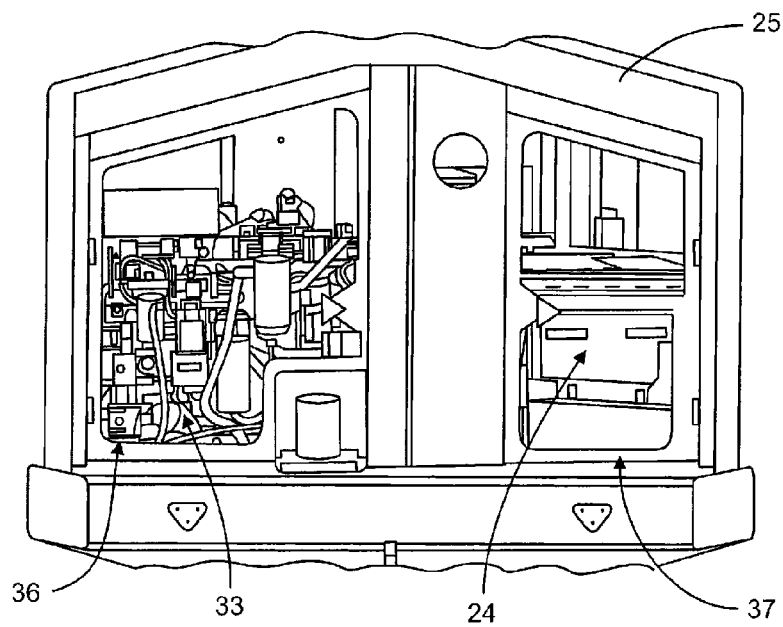
FIG. 4 is a rear plan view of a disclosed wheel feller-buncher.
Figure 7:
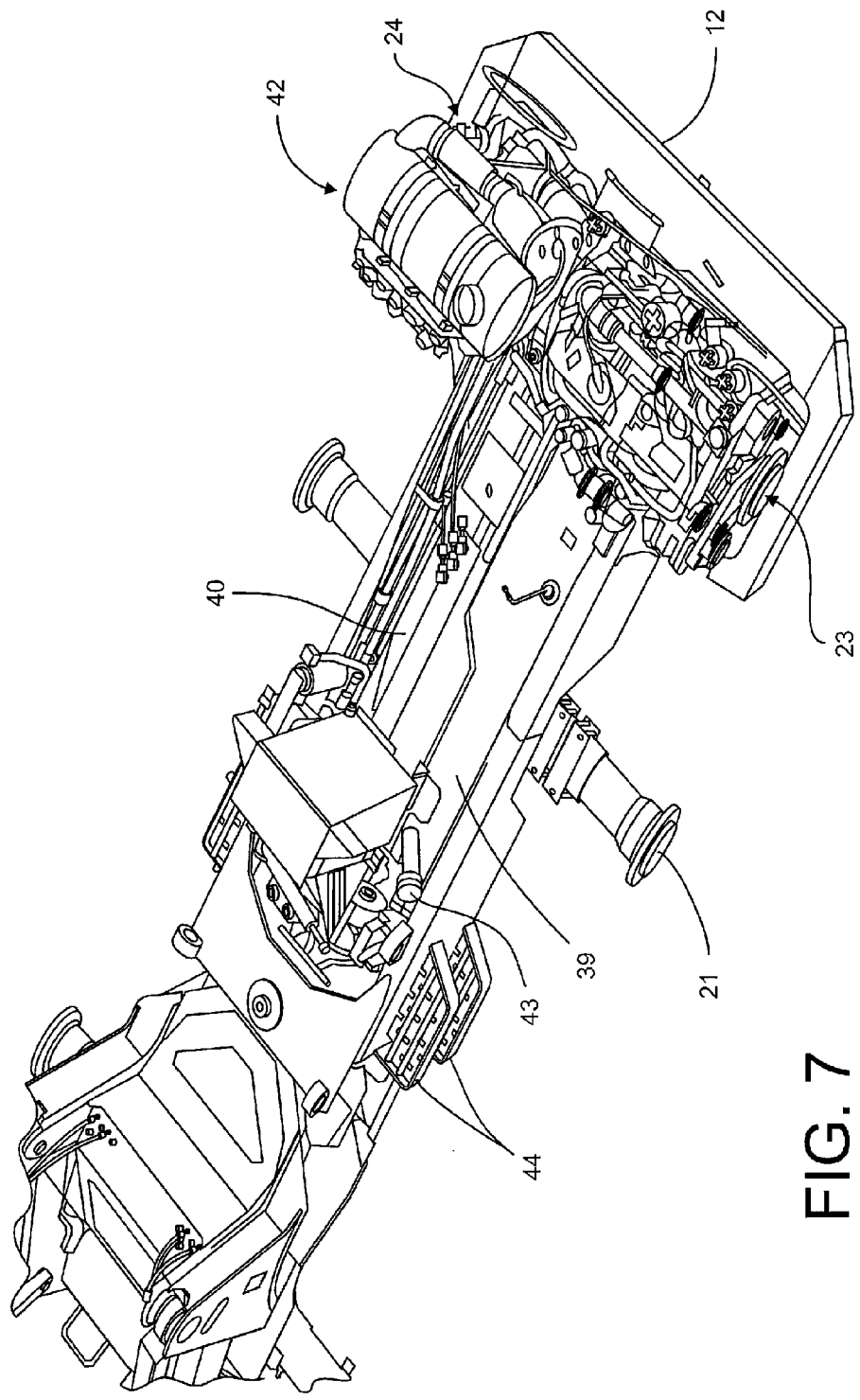
FIG. 7 is a left rear perspective view of a disclosed wheel feller-buncher with the cab and outer body parts removed to illustrate the placement of the fuel tank between the cab and the engine and the placement of the oil reservoir between the hydraulic system and the cab.
Figure 8:
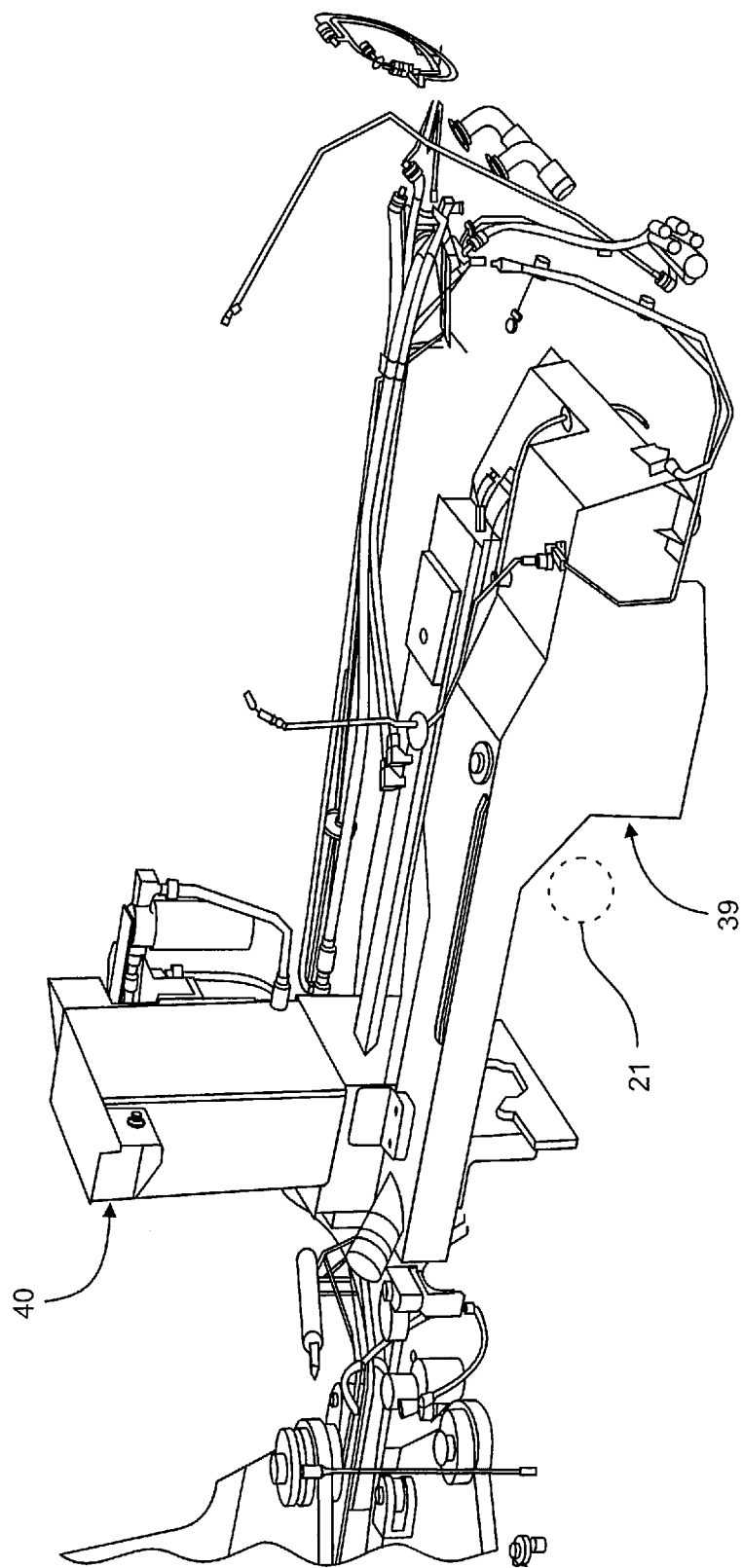
FIG. 8 is a partial left rear perspective view of a disclosed wheel feller-buncher illustrating the fuel tank and oil reservoir.

As shown in FIGS. 7-8, because the fuel 39 tank is molded to fit over the rear axle 21 and in alignment with the engine 23 while the oil tank 40 is in alignment with the hydraulic system 24, excellent left to right weight distribution is achieved in addition to the excellent front to rear weight distribution. By placing the fuel tank 39 over the rear axle 21, ground level access to the fuel tank 39 is provided. As seen in FIG. 4, the pumps of the hydraulic system 24 are readily accessible from multiple sides as is access to the non-turbo side of the engine 23.

FIG. 7 illustrates the transfer replacement of the engine 23 and hydraulic system 24 at the back of the rear frame 12 and in a parallel relationship with the rear axle 21. An emission control package 42 is placed above the hydraulic system 24. The fuel cap 43 is placed just behind the steps 44 for the cab 17 and is within easy reach of an operator standing on the ground.

Industrial Applicability

In general, improved wheeled forestry tractors, in the form of work site prep tractors and wheel feller-bunchers are disclosed with a unique engine/hydraulic system/fuel tank/oil tank orientation that provides improved balance across the rear axle and improved weight distribution across both axles. The improved wheeled forestry tractors include a front axle connected to the rear axle by an articulated chassis. A cab is supported between and above the rear axles by the chassis. An engine and hydraulic system are mounted opposite the rear axle from the cab an in a side-by-side relationship with respect to each other and with the engine being aligned transversely with respect to the chassis and parallel to the rear axle.

Figure 3:
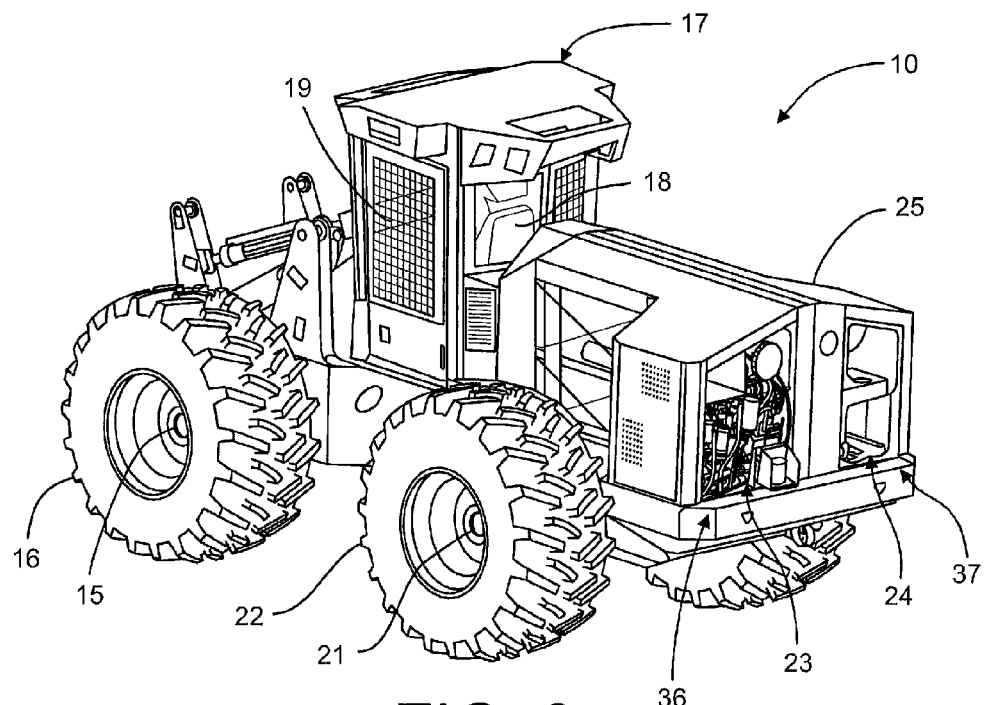
FIG. 3 is a left rear perspective view of a disclosed wheel feller-buncher.
Figure 5:
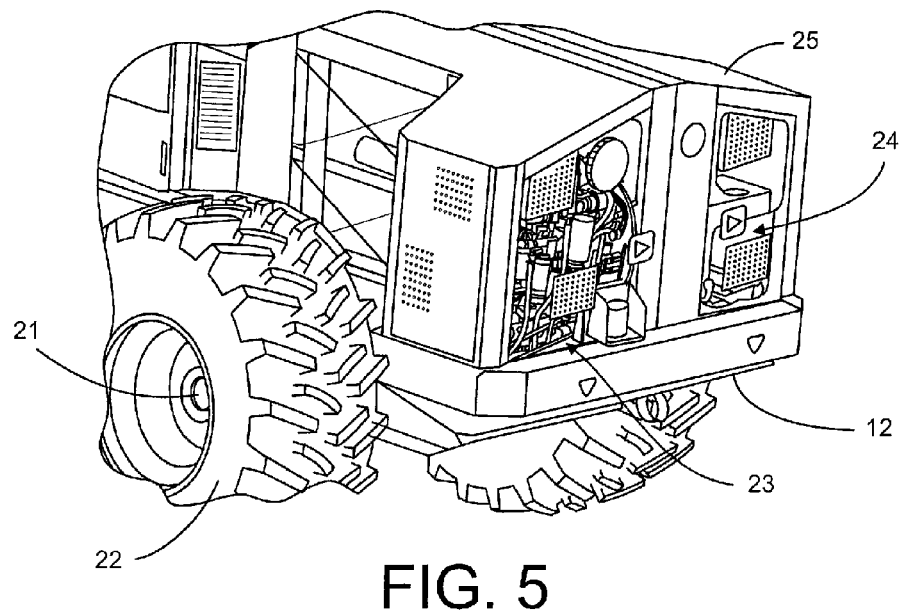
FIG. 5 is an enlarged partial view of the wheel feller-buncher shown in FIG. 3.
Figure 6:
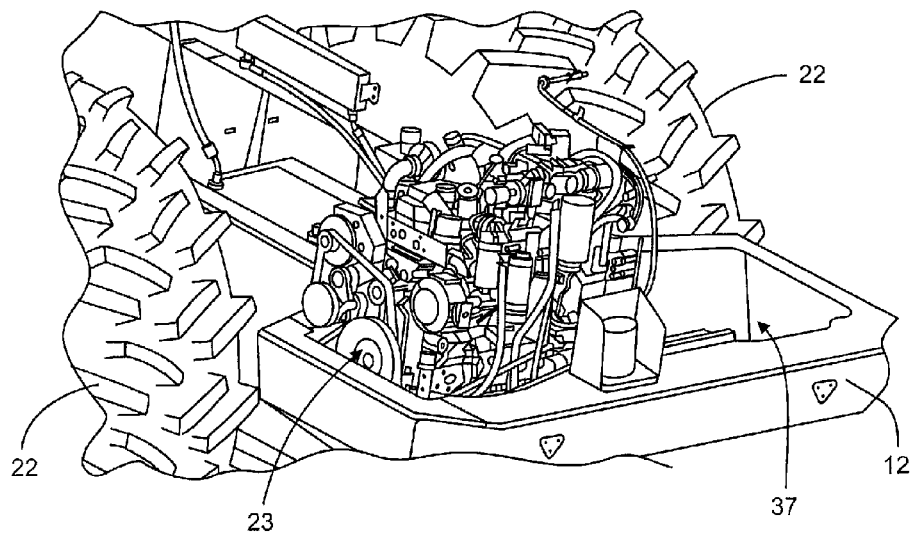
FIG. 6 is an enlarged left rear perspective view of the wheel feller-buncher shown in FIGS. 3-5, with the engine and hydraulic system enclosure removed.

With the engine on one side and hydraulic system on the other side, excellent weight distribution across the rear axle is achieved. Additional weight may be placed on the hydraulic side if an exhaust system is mounted above the hydraulic system. If needed, additional weight distribution across the rear axle may be achieved by providing the oil tank and oil reservoir in alignment with a hydraulic system and the fuel tank or fuel reservoir in general alignment with the engine. As an added feature, the fuel tank may be at least partially molded around the rear axle thereby lowering the profile of the fuel tank and enabling access to the opening or fuel tank cap by a person standing on the ground. By mounting the engine transversely at one corner of the machine while mounting the hydraulic system or hydraulic pumps at the other rear corner of the machine, certain advantages are achieved. Those advantages include improved weight distribution from both front to back and from left to right. Moving the engine rearward past the rear axle provides a substantial contribution to this improved front to rear weight distribution. Aligning the oil reservoir with the hydraulic system and aligning the fuel tank with the engine and folding the fuel tank at least partially over the rear axle contributes substantially to the improved left to right weight distribution. Finally, as seen in FIGS. 3-5, improved airflow through the engine compartment 36 is achieved as is improved accessibility to numerous engine components.

What is claimed is:

1. A wheeled forestry tractor comprising:
   a front axle connected to a rear axle by an articulated chassis,
   a cab supported between and above the front and rear axles by the chassis,
   an engine and a hydraulic system, the engine and hydraulic system being mounted opposite the rear axle from the cab and in a side-by-side relationship with the engine being aligned transversely with respect to the chassis and parallel to the rear axle,
   a fuel tank, the fuel tank and engine being disposed on one side of the tractor with the hydraulic system disposed on an opposite side of the tractor.

2. The tractor of claim 1, wherein the fuel tank is disposed at least partially above the rear axle.

3. The tractor of claim 1, further including a wherein the fuel tank with includes an inlet that is accessible by an operator standing on a ground surface.

4. The tractor of claim 3, wherein the fuel tank includes an inlet that is accessible by an operator standing on a ground surface.

5. The tractor of claim 3 wherein at least part of the fuel tank is disposed above the rear axle and at least part of the fuel tank is disposed below the rear axle.

6. The tractor of claim 1, wherein more than 65% of the weight of the tractor is distributed across the rear axle.

7. The tractor of claim 1, wherein from about 65% to about 70% of the weight of the tractor is distributed across the rear axle.

8. The tractor of claim 1, wherein about 68% of the weight of the tractor is distributed across the rear axle.

9. A wheeled forestry tractor comprising:
   a front axle connected to a rear axle by an articulated chassis,
   a cab supported between and above the front and rear axles by the chassis,
   an engine and a hydraulic system, the engine and hydraulic system being mounted opposite the rear axle from the cab and in a side-by-side relationship with the engine being aligned transversely with respect to the chassis and parallel to the rear axle,
   a fuel tank mounted at least partially above the rear axle and aligned between the engine and the cab.

10. The tractor of claim 9, wherein the fuel tank includes an inlet that is accessible by an operator standing on a ground surface.

11. The tractor of claim 9, wherein at least part of the fuel tank is disposed above the rear axle and at least part of the fuel tank is disposed below the rear axle.

12. The tractor of claim 9, wherein more than 65% of the weight of the tractor is distributed across the rear axle.

13. The tractor of claim 9, wherein from about 65% to about 70% of the weight of the tractor is distributed across the rear axle.

14. The tractor of claim 9, wherein about 68% of the weight of the tractor is distributed across the rear axle.

15. A method for improving increasing weight distributed across a rear axle of a wheeled forestry tractor, the method comprising:
   providing a wheeled forestry tractor with at least one attached tool system for clearing land, the tractor including a front axle connected to the rear axle by an articulated chassis, a cab supported between and above the front and rear axles by the chassis, an engine and a hydraulic system,
   mounting the engine and hydraulic system to the chassis and opposite the rear axle from the cab and in a side-by-side relationship and with the engine being aligned transversely with respect to the chassis and parallel to the rear axle,
   mounting a fuel tank between the engine and the cab.

16. The method of claim 15, further including mounting the fuel tank at least partially above the rear axle.

17. The method of claim 15, wherein the fuel tank includes an inlet that is accessible by an operator standing on a ground surface.

18. The method of claim 15, wherein more than 65% of the weight of the tractor is distributed across the rear axle.

* * * * *